(12) United States Patent
Komuravelli et al.

(10) Patent No.: US 11,580,192 B2
(45) Date of Patent: Feb. 14, 2023

(54) GROUPED CONVOLUTION USING POINT-TO-POINT CONNECTED CHANNEL CONVOLUTION ENGINES

(71) Applicant: Meta Platforms, Inc., Menlo Park, CA (US)

(72) Inventors: Rakesh Komuravelli, Fremont, CA (US); Krishnakumar Narayanan Nair, Newark, CA (US); Abdulkadir Utku Diril, Menlo Park, CA (US); Ehsan Khish Ardestani Zadeh, San Jose, CA (US); Yuchen Hao, Fremont, CA (US); Martin Schatz, Seattle, WA (US); Thomas Mark Ulrich, Mountain View, CA (US); Olivia Wu, Los Altos, CA (US); Anup Ramesh Kadkol, Sunnyvale, CA (US); Amin Firoozshahian, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 94 days.

(21) Appl. No.: 16/843,645

(22) Filed: Apr. 8, 2020

(65) Prior Publication Data
US 2021/0319076 A1    Oct. 14, 2021

(51) Int. Cl.
*G06F 17/15* (2006.01)
*G06F 7/544* (2006.01)
(Continued)

(52) U.S. Cl.
CPC .......... *G06F 17/153* (2013.01); *G06F 7/5443* (2013.01); *G06F 17/16* (2013.01); *G06N 3/063* (2013.01)

(58) Field of Classification Search
CPC ........ G06F 17/15; G06F 17/153; G06F 17/16; G06F 7/5443; G06N 3/04; G06N 3/06; G06N 3/063; G06N 3/08
See application file for complete search history.

(56) References Cited

U.S. PATENT DOCUMENTS

| | | | |
|---|---|---|---|
| 11,200,490 B2* | 12/2021 | Park | G06N 3/08 |
| 2009/0077449 A1* | 3/2009 | Lee | H03M 13/611 |
| | | | 714/785 |

(Continued)

OTHER PUBLICATIONS

Du L., et al., "A Reconfigurable Streaming Deep Convolutional Neural Network Accelerator for Internet of Things," IEEE Transactions on Circuits and Systems, Jul. 8, 2018 [Retrieved on Mar. 14, 2019], vol. 65, No. 1, 10 pages, Retrieved from the Internet: URL: https://arxiv.org/ftp/arxiv/papers/1707/1707.02973.pdf.

(Continued)

*Primary Examiner* — Emily E Larocque
*Assistant Examiner* — Carlo Waje
(74) *Attorney, Agent, or Firm* — Van Pelt, Yi & James LLP

(57) ABSTRACT

A processor system comprises a plurality of processing elements. Each processing element includes a corresponding convolution processor unit configured to perform a portion of a groupwise convolution. The corresponding convolution processor unit determines multiplication results by multiplying each data element of a portion of data elements in a convolution data matrix with a corresponding data element in a corresponding groupwise convolution weight matrix. The portion of data elements in the convolution data matrix that are multiplied belong to different channels and different groups. For each specific channel of the different channels, the corresponding convolution processor unit sums together at least some of the multiplication results belonging to the same specific channel to determine a corresponding channel (Continued)

convolution result data element. The processing elements sum together a portion of the channel convolution result data elements from a group of different convolution processor units to determine a groupwise convolution result data element.

20 Claims, 11 Drawing Sheets

(51) Int. Cl.
*G06F 17/16* (2006.01)
*G06N 3/063* (2006.01)

(56) References Cited

U.S. PATENT DOCUMENTS

| | | | | |
|---|---|---|---|---|
| 2018/0315155 A1* | 11/2018 | Park | ...................... | G06K 9/4647 |
| 2019/0026249 A1* | 1/2019 | Talpes | .................... | G06N 3/063 |
| 2019/0311249 A1* | 10/2019 | Zhang | ..................... | G06F 17/15 |
| 2019/0325296 A1* | 10/2019 | Fowers | ................ | G06F 15/8053 |
| 2019/0340502 A1* | 11/2019 | Park | ......................... | G06N 3/08 |
| 2020/0134797 A1* | 4/2020 | Zhang | ..................... | G06T 5/009 |
| 2020/0387771 A1* | 12/2020 | Nair | ........................ | H04L 67/10 |
| 2020/0410337 A1* | 12/2020 | Huang | ..................... | G06N 3/04 |
| 2021/0124560 A1* | 4/2021 | Liu | .......................... | G06F 17/16 |

OTHER PUBLICATIONS

European Search Report for European Application No. 21163649.3, dated Feb. 3, 2022, 10 pages.
Kristensen A.T., et al., "Lupulus: A Flexible Hardware Accelerator for Neural Networks," IEEE International Conference on Acoustics, Speech and Signal Processing (ICASSP), May 4, 2020, pp. 1608-1612.
Yang C., et al., "WRA: A 2.2-to-6.3 TOPS Highly Unified Dynamically Reconfigurable Accelerator Using a Novel Winograd Decomposition Algorithm for Convolutional Neural Networks," IEEE Transactions on Circuits and Systems, Sep. 1, 2019, vol. 66, No. 9, pp. 3480-3493.

* cited by examiner

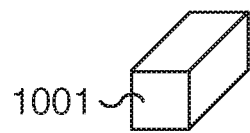
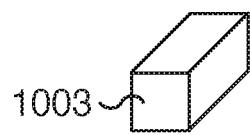
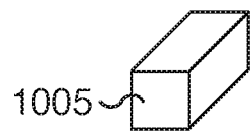
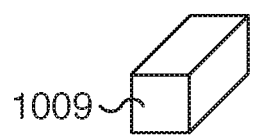
FIG. 10

GROUPED CONVOLUTION USING POINT-TO-POINT CONNECTED CHANNEL CONVOLUTION ENGINES

BACKGROUND OF THE INVENTION

A whole class of complex artificial intelligence problems can be solved using neural networks. Since these problems are often computationally and data intensive, hardware solutions are often beneficial for improving the performance of neural networks. The solutions to artificial intelligence problems can often be more quickly solved using hardware-based solutions that optimize solving traditional convolution operations. It is a technical challenge to create a hardware platform compatible with solving traditional convolution operations while also significantly improving the performance and efficiency of solving additional different types of convolution operations including grouped convolution operations. Therefore, there exists a need for a hardware and data path solution that improves on the ability to efficiently compute grouped convolution operations needed for solving certain complex artificial intelligence problems without introducing significant complexity and restrictions.

BRIEF DESCRIPTION OF THE DRAWINGS

Various embodiments of the invention are disclosed in the following detailed description and the accompanying drawings.

FIG. 10 is a diagram illustrating an example set of groupwise convolution weight matrices for solving a grouped convolution problem.

DETAILED DESCRIPTION

Figure 1:
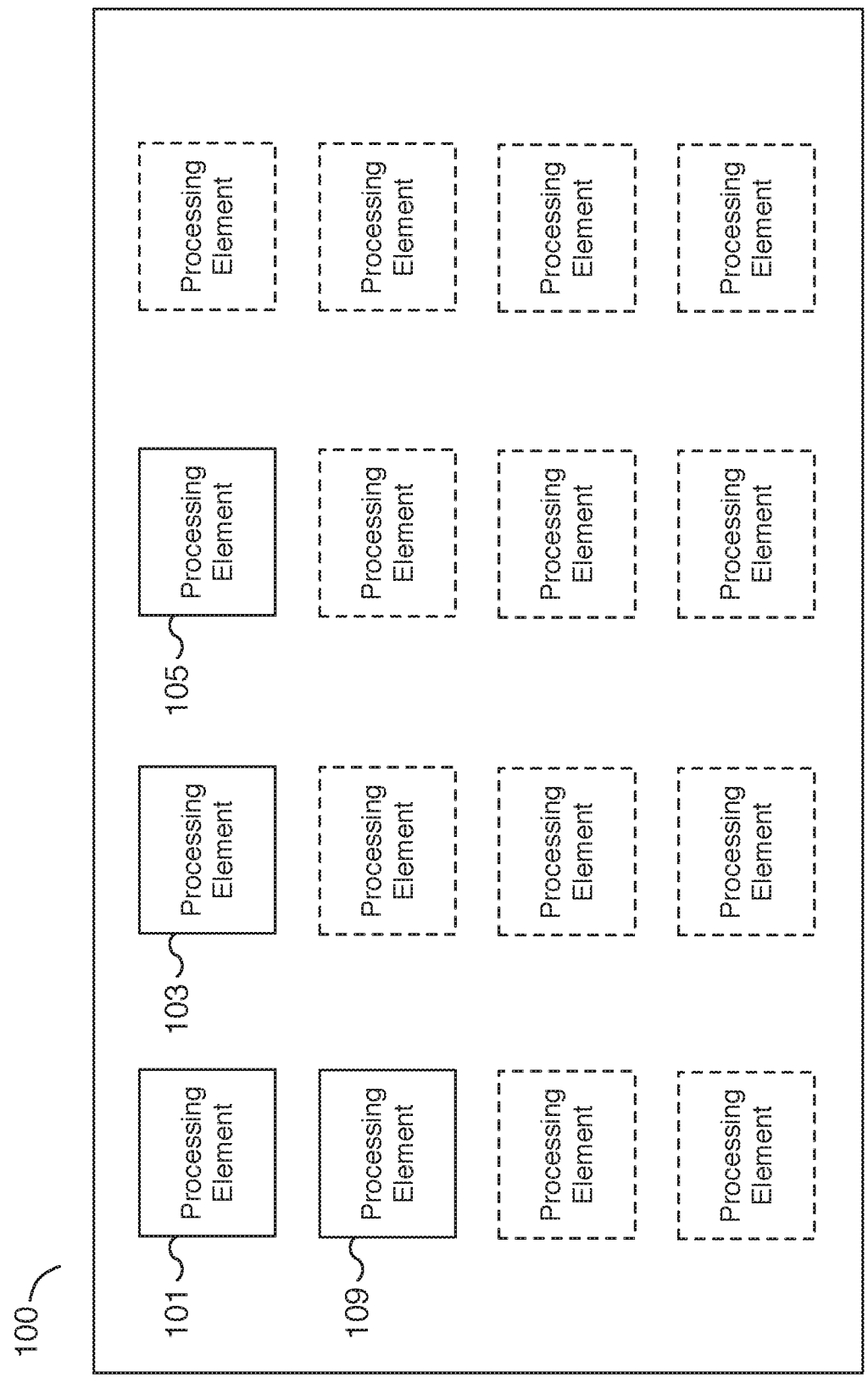
FIG. 1 is a block diagram illustrating an embodiment of a system for solving artificial intelligence problems using a neural network.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A distributed hardware accelerator system for solving grouped convolution problems is disclosed. In various embodiments, the system includes a hardware accelerator architecture with multiple processing elements. Each processing element is capable of solving convolution operations independently using a convolution engine such as a channel convolution engine. Using a point-to-point reduction network, the convolution results of one processing element can be provided to another processing element and the two convolution results can be reduced into a single result. In various embodiments, the reduction operation sums together the convolution results of two convolution engines without requiring either processing element to write its own convolution result to memory and then subsequently reading the results from memory to compute a sum. The number of memory writes is reduced, providing for improved power efficiency. The computation of a group convolution is spread across multiple processing elements by distributing the convolution operations associated with each channel of the group to a different processing element. For example, a grouped convolution computed over four channels is distributed across four processing elements, each computing partial results for one of the four channels. The four partial results are summed together using the reduction network.

In some embodiments, each convolution engine can be configured to process multiple convolution operations in parallel. For example, a channel convolution processor unit configured with 32 vector units can process 32 different convolution operations in parallel. By utilizing convolution engines configured with multiple vector units, multiple grouped convolutions can be solved in parallel. For example, for each of 32 different groups where each group is four channels deep, the first channels of each group can be processed by the first processing element, the second channels of each group can be processed by the second processing element, the third channels of each group can be processed by the third processing element, and the fourth channels of each group can be processed by the fourth processing element. Each vector unit of each channel convolution processor unit computes the partial grouped convolution result for a different one of the 32 different groups and the appropriate partial results are summed together using the reduction network. In this manner, multiple grouped convolutions each computed over four channels can be solved in parallel using four processing elements. Similarly, grouped convolutions computed over a different number of channels can be solved in parallel using a different appropriate number of processing elements. By distributing the channels of a single group across multiple processing elements and utilizing a reduction network to reduce the results, even group convolutions computed over a small number of channels can efficiently utilize the available hardware accelerator system resources. By utilizing hardware compute resources efficiently, significant performance benefits are achieved especially compared to a traditional general purpose processor and/or standard matrix processor hardware. The specialized hardware and data path configuration of the hardware system disclosed herein results in significant performance improvements and resource efficiencies gained over using a general purpose processor and traditional hardware configurations.

In some embodiments, a processor system comprises a plurality of processing elements, wherein each processing element of the plurality of processing elements includes a convolution processor unit. For example, a distributed hardware accelerator system includes multiple communicatively connected processing elements and each processing element includes a reduction unit and a convolution engine with a convolution processor unit. The processing elements may be connected to a shared bus or similar communication network in addition to having peer-to-peer connections that make up a reduction network. For example, a processing element can be connected to an upstream and a downstream processing element via a reduction network that bypasses a shared communication bus. The convolution engine of each processing element can perform multiple convolution operations in parallel, such as multiple channel convolution operations.

In some embodiments, each convolution processor unit of the plurality of convolution processor units is configured to perform a portion of a groupwise convolution. For example, the convolution engine of each processing element is capable of performing a portion of a groupwise convolution by utilizing channel convolution operations. Each channel of a group from within a convolution data matrix and the corresponding channel of the corresponding groupwise convolution weight matrix are assigned to a different processing element and its respective convolution processor unit. For each assigned processing element, multiple channels from different groups within the convolution data matrix and their corresponding channels from corresponding different groupwise convolution weight matrices can also be assigned to the processing element. For each processing element, the assigned channels of different groups are a portion of data elements in the convolution data matrix and correspond to sub-matrices or matrix slices located at a different channel (or depth) of the convolution data matrix. In some embodiments, each sub-matrix or matrix slice has the same relative channel (or depth) within its respective group. For example, a sub-matrix of data elements from channels 1, 5, 9, 13, 17, 21, 25, and 29 of the convolution data matrix can be assigned to a specific processing element capable of processing eight convolution operations in parallel by its convolution processor unit. The sub-matrix of data elements from channels 1, 5, 9, 13, 17, 21, 25, and 29 correspond to the first channel in each of their respective groups, where the groups are each four channels deep. Similarly, a sub-matrix of data elements from channels 2, 6, 10, 14, 18, 22, 26, and 30 of the convolution data matrix can be assigned to a second processing element and its respective convolution processor unit. A sub-matrix of data elements from channels 3, 7, 11, 15, 19, 23, 27, and 31 are assigned to a third processing element and a sub-matrix of data elements from channels 4, 8, 12, 16, 20, 24, 28, and 32 are assigned to a fourth processing element. In the event additional groups exist, for example, the next set of eight groups corresponding to data elements from channels 33-64 of the convolution data matrix, the next eight groups can be assigned in a distributed manner by channel to another set of four processing elements. The corresponding channels of the corresponding groupwise convolution weight matrices are assigned to match the weight matrix channels to the appropriate data elements of the convolution data matrix.

In some embodiments, each convolution processor unit is configured to determine multiplication results by multiplying each data element of a portion of data elements in a convolution data matrix with a corresponding data element in a corresponding groupwise convolution weight matrix among a plurality of convolution weight matrices. For example, for each channel of a group and its corresponding weight matrix channel assigned to a convolution processor unit, the appropriate data elements from the group and weight matrices are multiplied to determine multiplication results. In some embodiments, a vector multiplication operation is performed to multiply each data element of a group matrix slice with the appropriate data element of a weight matrix slice. For example, for two 3×3 matrices, nine multiplication results are determined. In some embodiments, the portion of data elements in the convolution data matrix that are multiplied belong to a plurality of different channels and a plurality of different groups within the convolution data matrix. For example, each vector multiplication operation is performed on data elements from a different channel of the convolution data matrix and a different group from within the convolution data matrix.

In some embodiments, each convolution processor unit is configured to, for each specific channel of the plurality of channels, sum together at least some of the multiplication results belonging to the same specific channel to determine a corresponding channel convolution result data element for the specific channel. For example, the individual multiplication results of each vector multiplication operation performed by the convolution processor unit are summed together to determine a channel convolution result data element. In some embodiments, the summing together of the multiplication results is a dot product operation. In various embodiments, the multiplication results for each assigned channel of each convolution processor unit are summed together. For example, a convolution processor unit processing eight different channels determines eight different channel convolution result data elements.

In some embodiments, the plurality of processing elements is configured to sum a portion of the channel convolution result data elements from a group of different convolution processor units included in the plurality of convolution processor units to determine a groupwise convolution result data element. For example, for each group within the convolution data matrix, the corresponding channel convolution result data elements determined using the convolution processor units of different processing elements are summed together to determine a groupwise convolution result data element. In some embodiments, the summation operation can be distributed across multiple processing elements and performed using a reduction network. For example, a reduction unit at each processing element can sum together its convolution engine result with an upstream result (if applicable) before transmitting the running sum to a reduction unit of a downstream processing element. For each group, the running sum is updated at each subsequent downstream processing element until channel convolution results corresponding to all channels of the group have been accounted for and a final groupwise convolution result is determined. An upstream and downstream processing element are linked via a peer-to-peer connection of the reduction network. In various embodiments, the final sum is a groupwise convolution result data element. Since each reduction unit can operate on a vector of running sums, multiple groupwise convolution result data elements can be determined in parallel.

FIG. 1 is a block diagram illustrating an embodiment of a system for solving artificial intelligence problems using a neural network. For example, system 100 may be applied to use a neural network to solve problems such as image recognition and recommendation system matches. The convolution operations corresponding to the different layers of the neural network can be solved by distributing computational workload to the different processing elements of system 100. In particular, grouped convolution operations can be mapped to system 100 by performing distributed channel convolution operations. In the example shown, system 100 includes multiple processing elements such as processing elements 101, 103, 105, and 109. Additional processing elements are displayed in dotted boxes. Each processing element may be utilized by system 100 to perform convolution operations such as channel convolution operations. In various embodiments, the system 100 may include fewer or more processing elements. For example, the number of processing elements can be scaled up or down depending on the intended computational and data requirements. In some embodiments, system 100 is communicatively connected to a memory unit (not shown). For example, the memory unit may be a last level cache (LLC), a shared memory, and/or may be implemented using static random-access memory (SRAM).

In some embodiments, the processing elements of system 100, including processing elements 101, 103, 105, and 109, are connected to a communication bus (not shown). The communication bus may be used to transmit processing element instructions and optional instruction arguments. For example, a convolution operation instruction and convolution operands may be transmitted to a processing element, such as processing element 101, via the communication bus. In various embodiments, a large, complex artificial intelligence problem can be solved using system 100 by subdividing the problem into distributed operations, such as channel convolution operations. The distributed operations can be assigned to different processing elements. Convolution arguments such as data elements of a convolution data matrix and data elements of groupwise convolution weight matrices can be distributed to the appropriately assigned processing elements. The results of the assigned distributed operations can be merged to determine the solution to the larger and more complex convolution problem, such as a grouped convolution problem. In some scenarios, the distributed operations are solved in parallel and/or in pipelined stages. In some scenarios, the result from a first processing element is fed as an input to a second processing element. For example, the channel convolution results of a first processing element are summed with the channel convolution results of a second processing element. The results are then summed with the channel convolution results of a third processing element, and so forth, until a final vector of summed results is determined that corresponds to determining the result of a grouped convolution problem.

In various embodiments, the processing elements of system 100, such as processing elements 101, 103, 105, and 109, each may include a convolution processor unit (not shown), a reduction unit (not shown), and a point-to-point connection (not shown) with another processing element. For example, a point-to-point connection provides the compute result of one processing element to the reduction unit of a downstream processing element. The reduction unit receives both the result of its processing element and the upstream result and merges the two results together. The merged result can be provided to a subsequent downstream processing element via a separate point-to-point connection with the subsequent downstream processing element. In some embodiments, multiple processing elements are daisy-chained together via multiple point-to-point connections to merge the results of multiple processing elements. In various embodiments, the output of a first convolution processor unit of a first processing element can be summed with the output of a second convolution processor unit of a second processing element by transmitting the result of the first convolution processor unit via a point-to-point connection to the reduction unit of the second processing element. The reduction unit of the second processing element merges the outputs of both convolution processor units.

Figure 2:
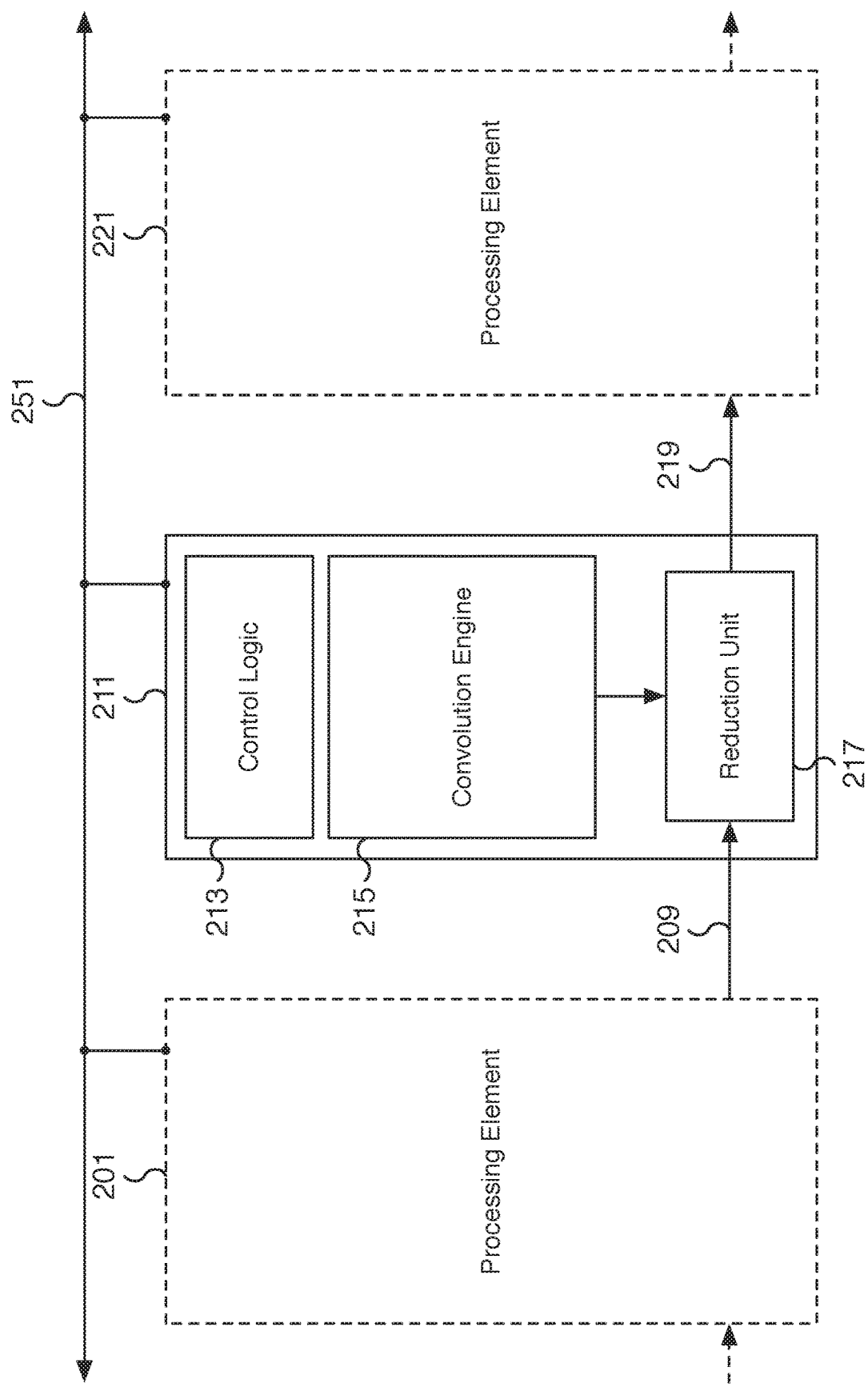
FIG. 2 is a block diagram illustrating an embodiment of a processing element for solving artificial intelligence problems using a neural network.

FIG. 2 is a block diagram illustrating an embodiment of a processing element for solving artificial intelligence problems using a neural network. In the example shown, processing element 211 includes control logic 213, convolution engine 215, and reduction unit 217. Processing element 211 is connected to processing element 201 via point-to-point connection 209 and to processing element 221 via point-to-point connection 219. Processing element 211 is also connected to communication bus 251. Processing elements 201 and 221 are shown as dotted boxes and some details of processing elements 201 and 221 are not shown. Dotted arrows leading to processing element 201 and from processing element 221 are optional point-to-point connections from additional (optional) processing elements (not shown). Similar to processing element 211, processing elements 201 and 221 are connected to communication bus 251. In some embodiments, processing element 211 is one of processing elements 101, 103, 105, and/or 109 of FIG. 1 and point-to-point connection 209 and/or 219 is a point-to-point connection connecting to another processing element of FIG. 1.

In some embodiments, control logic 213 of processing element 211 is used to control the operation of processing element 211 including the operation of convolution engine 215 and reduction unit 217. For example, control logic 213 may be used to determine how to align data received at reduction unit 217, including what byte lane to assign different data arguments. In some embodiments, control logic 213 is used to process instructions received by processing element 211 via communication bus 251. For example, a processing element instruction may include channel convolution operation instructions, channel convolution arguments, byte alignment commands, etc.

In some embodiments, convolution engine 215 includes a convolution processor unit for performing convolution operations such as channel convolution operations. For example, convolution engine 215 may be a channel convolution engine for performing channel convolution operations using data elements from a convolution data matrix and corresponding weights as arguments. In some embodiments, convolution engine 215 may receive a portion of data elements from a convolution data matrix and corresponding data elements of corresponding groupwise convolution weight matrices to determine channel convolution result data elements for specific channels of the convolution data matrix. Convolution engine 215 of processing element 211 can be used, in part, to solve a grouped convolution problem by performing distributed channel convolution operations with neighboring processing elements such as processing elements 201 and 221. In some embodiments, convolution engine 215 may include input and/or output buffers for loading input data elements and writing out result data elements. In the example shown, convolution engine 215 provides the output result to reduction unit 217.

In some embodiments, reduction unit 217 is a hardware unit for reducing two data inputs. In the example shown, reduction unit 217 receives a first input operand from convolution engine 215 and a second input operand from processing element 201 via point-to-point connection 209. In various embodiments, the first input operand from convolution engine 215 is a convolution operation result and the second input operand is a processing result from processing element 201. In some embodiments, the processing result from processing element 201 may be the result of a convolution operation performed by processing element 201 and/or the result from merging the convolution operation result of processing element 201 using a corresponding reduction unit (not shown) of processing element 201. Once the two input operands are received by reduction unit 217, reduction unit 217 provides the reduced result to processing element 221 via point-to-point connection 219. In various embodiments, reduction unit 217 merges (or reduces) two inputs into a single output. In some embodiments, the reduction operation is a sum operation of the two inputs to reduction unit 217. Other operations on the two inputs may be appropriate as well, such as logical operations (AND, OR, XOR, etc.), shift operations, a subtraction operation, etc., as well as combinations of operations. The output can then be provided to a downstream processing element via a point-to-point connection. In some embodiments, one or both inputs may be shifted so that each input is preserved but aligned differently. For example, reduction unit 217 may shift one input to concatenate the two inputs together. As an example, two 8-byte inputs can be merged into a 16-byte output result. Similarly, two 16-byte inputs can be merged into a 32-byte output result. In various embodiments, different input data sizes (e.g., 4-byte, 8-byte, 16-byte, etc.) and alignment options may be appropriate depending on the compute context.

In some embodiments, point-to-point connections 209 and 219 are network connections from processing element 201 and to processing element 221, respectively, for processing element 211. Point-to-point connection 209 is used to provide a convolution operation result and/or the result of a reduction unit (not shown) of processing element 201 to reduction unit 217 of processing element 211. Point-to-point connection 219 is used to provide the result of reduction unit 217 of processing element 211 to a reduction unit (not shown) of processing element 221. In various embodiments, processing elements can include a connection to an upstream processing element, such as point-to-point connection 209 for processing element 211, and/or a connection to a downstream processing element, such as point-to-point connection 219 for processing element 211. By utilizing a point-to-point connection, the convolution compute result of a convolution engine does not need to be transmitted over communication bus 251. Bus protocols and other related overhead for bus communication are avoided.

Figure 3:
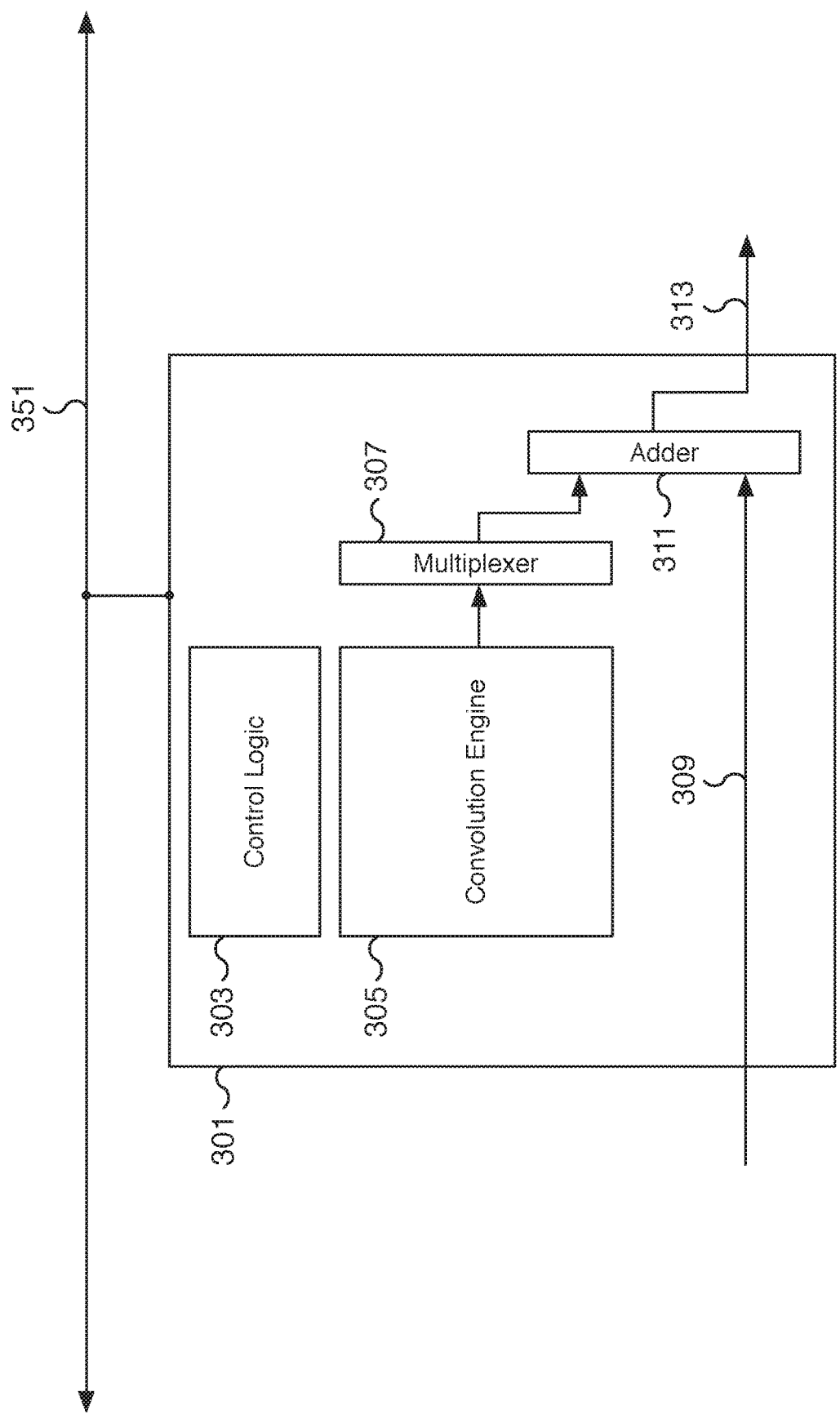
FIG. 3 is a block diagram illustrating an embodiment of a processing element for solving artificial intelligence problems using a neural network.

FIG. 3 is a block diagram illustrating an embodiment of a processing element for solving artificial intelligence problems using a neural network. In the example shown, processing element 301 includes control logic 303, convolution engine 305, multiplexer 307, adder 311, point-to-point connection 309, and point-to-point connection 313. Processing element 301 is connected to communication bus 351, an upstream processing element (not shown) via point-to-point connection 309, and a downstream processing element (not shown) via point-to-point connection 313. In some embodiments, processing element 301 is processing element 211 of FIG. 2 and control logic 303, convolution engine 305, point-to-point connection 309, point-to-point connection 313, and communication bus 351 are control logic 213, convolution engine 215, point-to-point connection 209, point-to-point connection 219, and communication bus 251, respectively, of FIG. 2. In some embodiments, multiplexer 307 and adder 311 are included as part of reduction unit 217 of FIG. 2.

In various embodiments, control logic 303 and convolution engine 305 function as described with respect to control logic 213 and convolution engine 215 of FIG. 2. For example, control logic 303 processes processing element instructions including convolution operation instructions received via communication bus 351. Similarly, convolution engine 305 receives convolution operations and performs convolution operations such as channel convolution operations on data elements of a convolution data matrix and corresponding weights. In the example shown, the output of convolution engine 305 is provided to multiplexer 307.

In some embodiments, multiplexer 307 can be utilized to realign the output of convolution engine 305. For example, an 8-byte compute result can be shifted 8-bytes and stored as a 32-byte padded value. In various embodiments, the realigned output is padded with zeros so that the realigned output can be merged with additional 8-byte results. For example, using a 32-byte value, four 8-byte convolution engine results can be merged together using a series of four disclosed processing elements. In various embodiments, multiplexer 307 is used to shift the input to multiplexer 307 by a configured number of bits. The number of bits may be byte aligned and/or a multiple of 8-bits (e.g., 8-bytes, 16-bytes, 24-bytes, etc.). For example, a 16-byte convolution result can be shifted 16 bytes. In some embodiments, the number of bits a convolution engine result is shifted is specified by a processing element instruction. The number of bits specified can be 0-bits resulting in the input passing through multiplexer 307 unchanged, for example, to sum two inputs using adder 311. In some embodiments, multiplexer 307 is sized to match the output size of convolution engine 305. For example, a convolution engine that computes a 32-byte result is configured with a multiplexer that can receive a 32-byte input. In various embodiments, the input size and output size of multiplexer 307 are the same. For example, a multiplexer that receives a 32-byte convolution result outputs a realigned 32-byte output. In some embodiments, multiplexer 307 is implemented using another appropriate hardware unit for realigning data. The realigned convolution result is provided to adder 311.

In some embodiments, adder 311 receives the convolution result from multiplexer 307 (possibly realigned) along with a second input via point-to-point connection 309. The second input may be the processing result of an upstream processing element. For example, the processing result can be a convolution result or multiple reduced (or summed) convolution results. Adder 311 merges (or reduces) the two received inputs into a single output result. In some embodiments, the two results are added together by adder 311 to effectively sum together the inputs. For example, a zero-padded multiplexer result is added to the input provided via point-to-point connection 309. The result is then provided to a downstream processing element (not shown) via point-to-point connection 313.

In some embodiments, adder 311 is a vector adder and performs vector adder operations. For example, adder 311 receives two vectors, each with multiple elements and sums together the respective elements of each input vector. The adder result is a vector of addition results. As one example, the two inputs may each be 32-element vectors. Adder 311 sums together each of the respective elements of each input vector to determine 32 addition results. The 32 addition results may be stored as a vector result and transmitted downstream via point-to-point connection 313. Although the vectors are 32-elements in size in the example, another vector size is applicable as well depending on the hardware configuration.

In various embodiments, point-to-point connections between processing elements, such as point-to-point connections 309 and/or 313, are used to reduce convolution engine results without needing to first write a convolution result to memory, avoiding a potentially expensive memory operation. Moreover, by chaining together multiple processing elements using the point-to-point connections, the outputs of each convolution engine in the chain can be summed together using the corresponding adder units of each processing element.

Figure 4:
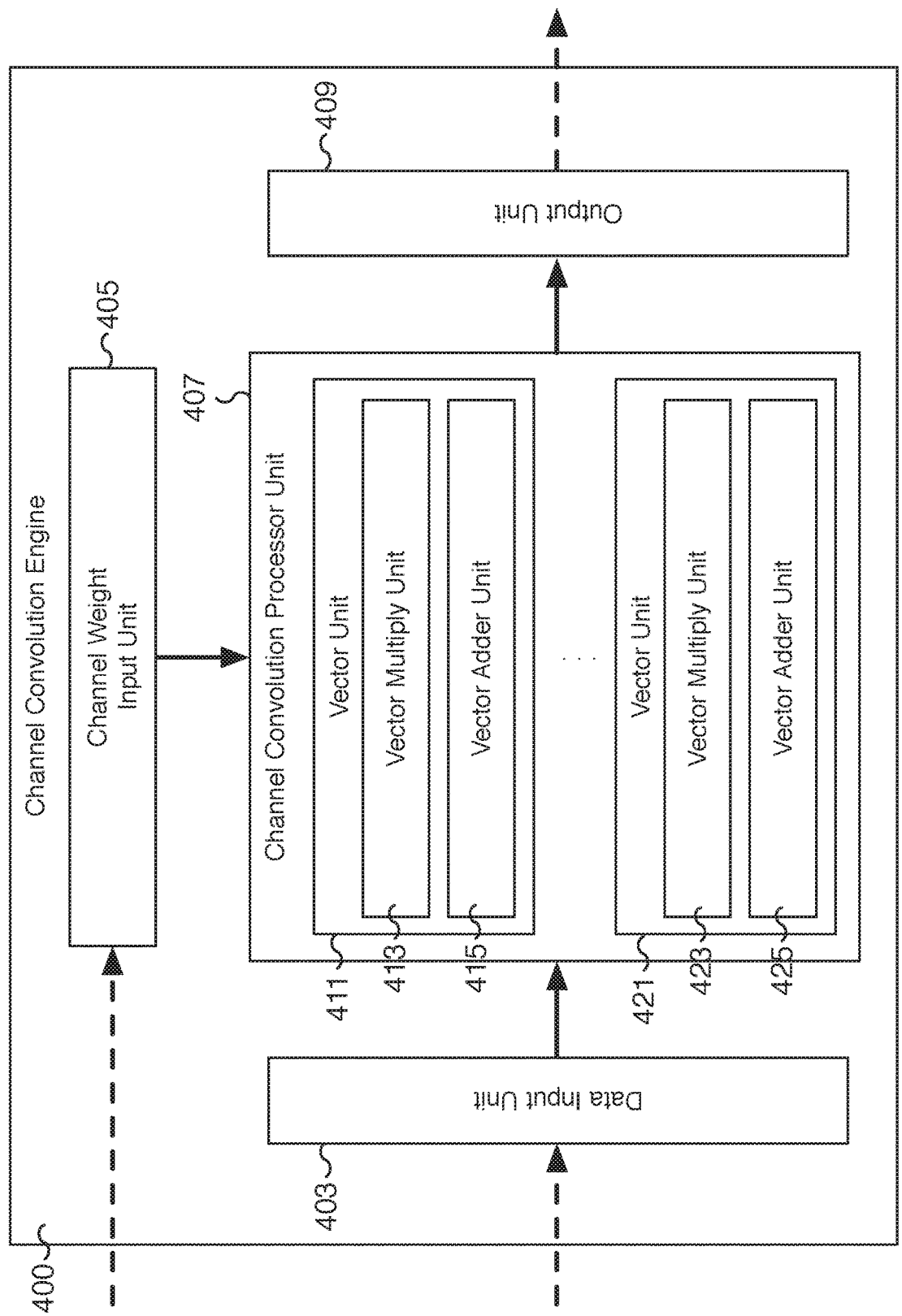
FIG. 4 is a block diagram illustrating an embodiment of a channel convolution engine for solving artificial intelligence problems using a neural network.

FIG. 4 is a block diagram illustrating an embodiment of a channel convolution engine for solving artificial intelligence problems using a neural network. In the example shown, channel convolution engine 400 includes data input unit 403, channel weight input unit 405, channel convolution processor unit 407, and output unit 409. In some embodiments, channel convolution engine 400 is a hardware integrated circuit, for example, an application specific integrated circuit (ASIC) and includes hardware components data input unit 403, channel weight input unit 405, channel convolution processor unit 407, and output unit 409. As compared to a general purpose processor, channel convolution engine 400 is designed and implemented using a specialized hardware integrated circuit to more efficiently perform one or more specific computing tasks related to performing convolution operations and/or solving artificial intelligence problems using a neural network. The specialized hardware results in significant performance improvements and resource efficiencies gained over using a general purpose processor. In some embodiments, channel convolution engine 400 is convolution engine 215 of FIG. 2 and/or convolution engine 305 of FIG. 3. In various embodiments, channel convolution engine 400 is utilized to perform distributed channel convolution operations to solve a larger grouped convolution problem.

In the example shown, channel convolution processor unit 407 includes multiple vector calculation units including at least vector units 411 and 421. In various embodiments, channel convolution processor unit 407 receives data input vectors (not shown) from data input unit 403 and channel weight input vectors (not shown) from channel weight input unit 405. For example, in some embodiments, data input vectors are generated by data input unit 403 that correspond to 2D sub-matrices of a 3D activation data input matrix, where each 2D sub-matrix corresponds to a different channel of the 3D activation data input matrix. Channel weight input vectors are generated by channel weight input unit 405 and correspond to different weight matrices. In various embodiments, the 2D sub-matrices of the 3D activation data input matrix and the channel weight matrices may be 3×3 matrices or another appropriate size. The 2D sub-matrices may come from a plurality of different channels of a plurality of different groups within the convolution data matrix or from a plurality of different convolution weight matrices. The data elements of the activation data input matrix and the weight input matrices may be stored and retrieved from memory (not shown).

In some embodiments, each generated data input vector and channel weight input vector pair may be passed as arguments to a vector calculation unit, such as one of vector units 411 and 421, of channel convolution processor unit 407. For example, a vector unit of channel convolution processor unit 407 may determine a channel convolution result data element, such as a dot product result, using a data input vector and channel weight input vector pair. In some embodiments, channel convolution processor unit 407 includes 32 vector units and/or another appropriate number of vector units. The number of vector units may be based on the cache line size, for example, the cache line size or a multiple of the cache line size. For example, the cache line multiple can be one and the number of vector units may be equal to the cache line size. Each vector unit may take data elements corresponding to two vectors as arguments and can each produce a single element result. Using 3×3 matrices as an example, each vector unit takes two 9-element vectors as arguments, one vector corresponding to a sub-matrix of the activation data input matrix and one vector corresponding to a weight matrix. Taken across all vector units of channel convolution processor unit 407, the results are a vector of channel convolution results and can correspond to data elements of a channel convolution result matrix. In some embodiments, different portions of the activation data input matrix are processed over additional iterations. For example, the same weight matrices can be used by channel convolution processor unit 407 to determine additional data elements of the channel convolution result matrix. In some embodiments, the output of channel convolution processor unit 407 for each iteration can be an output vector and is received at output unit 409. In some embodiments, the output vector received at output unit 409 is a 32-element vector. Although 32 channels are processed using 3×3 matrices for each iteration in the example above, the size of the elements and matrices processed by channel convolution engine 400 can be configured as appropriate. For example, elements may be 4-bits, 8-bits, 2-byte, 4-bytes, or another appropriate size. Similarly, the sub-matrices of the activation data input matrix and channel weight matrices can be 3×3, 5×5, or another appropriate size. In some embodiments, the results calculated by channel convolution processor unit 407 are channel convolution results used to compute a larger grouped convolution problem. For example, the results from channel convolution processor unit 407 are summed together with the channel convolution results from different channel convolution processor units to determine a groupwise convolution result.

In some embodiments, channel convolution processor unit 407 is configured to receive multiple pairs of input matrices. Each pair of input matrices includes a data input matrix and a corresponding weight matrix. Each data input matrix corresponds to a particular channel of a portion of an activation data input matrix and is processed by data input unit 403. Each weight input matrix corresponds to the weight matrix to be applied to the channel and is processed by channel weight input unit 405. Data input unit 403, channel weight input unit 405, and output unit 409 may be implemented using hardware registers, such as flip-flop circuits, for transferring multiple input and output elements to/from channel convolution processor unit 407. In some embodiments, elements corresponding to each data input vector are retrieved from memory and loaded into a corresponding vector unit, such as vector units 411 or 421, of channel convolution processor unit 407 via data input unit 403. For example, a channel convolution processor unit with 32 vector units can be loaded with 32 vectors of data input elements corresponding to 32 different channels of an activation data input matrix via data input unit 403. In some embodiments, the different channels belong to different groups within the convolution data matrix. Similarly, elements corresponding to each weight input vector are retrieved from memory and loaded into a corresponding vector unit, such as vector units 411 or 421, of channel convolution processor unit 407 via channel weight input unit 405. For example, a channel convolution processor unit with 32 vector units can be loaded with 32 vectors of channel weight input elements corresponding to 32 different weight matrices via channel weight input unit 405. The weight matrices can correspond to channels from different 3D convolution weight groups (or filter groups). In some embodiments, as results corresponding to portions of the activation data input matrix are determined, additional data elements are loaded for processing additional portions of the activation data input matrix with the same weight matrices. For example, data input unit 403 loads additional needed data elements and generates new data input vectors corresponding to the new portion of the activation data input matrix for determining additional channel convolution results. As the data input vectors change to correspond to new portions of the activation data input matrix, the weight input vectors can remain the same and can be reused, significantly improving the efficiency of convolution operations. In various embodiments, the arrows of FIG. 4 represent the direction data moves through the components of channel convolution engine 400. For example, the arrows may correspond to multi-element wide communication/data buses and/or data lines. In various embodiments, an output vector result received at output unit 409 is transmitted to a reduction unit where the result can be merged with another vector input. In some embodiments, additional components of channel convolution engine 400 are not shown.

In various embodiments, each vector unit of channel convolution processor unit 407, such as vector units 411 or 421, receives two vector operands and can perform one or more vector operations. For example, a vector unit can compute the dot product of the two input operands and output the result as one element of an output vector to output unit 409. In various embodiments, the output result of a vector unit corresponds to a channel convolution result data element. In some embodiments, each vector unit of channel convolution processor unit 407, such as vector units 411 or 421, includes both a multiply unit and an adder unit. For example, vector unit 411 includes vector multiply unit 413 and vector adder unit 415 and vector unit 421 includes vector multiply unit 423 and vector adder unit 425.

In some embodiments, multiple instances of channel convolution engine 400 can operate together to process different portions of an activation data input matrix. For example, each processing element and corresponding channel convolution engine can retrieve its assigned data elements of the activation data input matrix and corresponding weight matrices. In some embodiments, different processing elements share weight matrices and the data elements of the shared weight matrices can be broadcasted to the appropriate processing elements to improve memory efficiency. Each channel weight input unit of a processing element performs channel convolution operations on the assigned portions of the activation data input matrix using its own channel convolution processor unit. The results of each processing element can be transmitted to a reduction unit such as reduction unit 217 of FIG. 2. In some embodiments, a series of reduction units is utilized to sum together the results of corresponding channel convolution processor units to determine a grouped convolution result.

Figure 5:
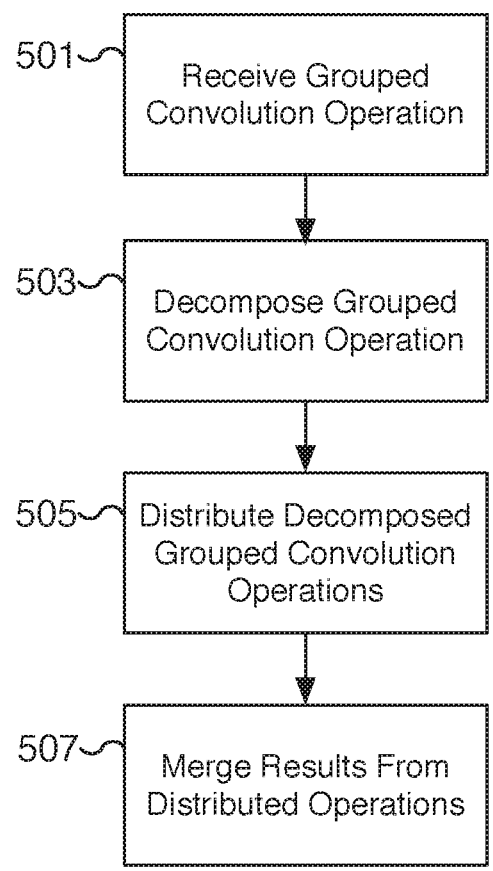
FIG. 5 is a flow chart illustrating an embodiment of a process for solving a grouped convolution problem.

FIG. 5 is a flow chart illustrating an embodiment of a process for solving a grouped convolution problem. For example, a grouped convolution problem is distributed over a smaller number of input channels using hardware that supports per-channel convolutions. In various embodiments, the hardware system includes multiple processing elements and the appropriate hardware convolution engine for solving distributed convolution operations and merging the results. The grouped convolution problem can be decomposed into multiple channel convolution operations and the results of the channel convolution operations summed together using a reduction network. In some embodiments, the process of FIG. 5 is implemented using a hardware system such as system 100 of FIG. 1.

At 501, a grouped convolution operation is received. The grouped convolution operation includes operands such as a 3D convolution data matrix and groupwise convolution weight matrices. In various embodiments, the grouped convolution operation may require computing grouped convolutions over a small number of channels that can not be efficiently mapped to a matrix multiply processor. For example, in some embodiments, a grouped convolution problem may be computed over only four input channels whereas each processing element can process 32 input channels simultaneously. This mismatch results in underutilization of compute resources. In order to perform the grouped convolution operation efficiently, the problem is decomposed into multiple smaller operations such as multiple channel convolution operations.

At 503, the grouped convolution operation is decomposed. For example, the grouped convolution operation received at 501 is decomposed into smaller sub-problems. Each sub-problem utilizes convolution operations, such as channel convolution operations, that a single processing element can process. For example, a processing element configured with a convolution engine that can compute 32 channel convolution data element results is assigned a portion of the original grouped convolution problem. In various embodiments, the output of one sub-problem may be reduced with the output of another sub-problem, for example, by summing the results together. In some embodiments, the sub-problems can be solved in parallel and/or in pipelined stages.

At 505, decomposed operations are distributed. For example, each of the sub-problems of the decomposed grouped convolution operation of 503 is distributed to a processing element. In various embodiments, multiple processing elements of the hardware system each receive a sub-problem to solve. The received sub-problem may utilize a subset of the original grouped convolution arguments such as a portion of data elements from the 3D convolution data matrix and groupwise convolution weight matrices specified at 501. In some embodiments, a processing element may also receive as input the result computed by another processing element, for example, to sum together (or reduce) two sets of convolution results. The distributed operations may be solved in parallel by the assigned processing elements to achieve significant performance improvements.

At 507, results from distributed operations are merged. For example, the results of each distributed operation are reduced and merged to determine a final result for the grouped convolution operation received at 501. In some embodiments, the results are first reduced in part by daisy-chaining processing elements and utilizing point-to-point connections between processing elements as described herein. The reduced results may be written more efficiently to avoid unnecessary memory writes, which results in significant performance improvements. In various embodiments, reduced results solved using distributed processing elements of the hardware system are finally merged together, for example, by writing to a shared memory location, to determine the final result of the grouped convolution operation received at 501.

Figure 6:
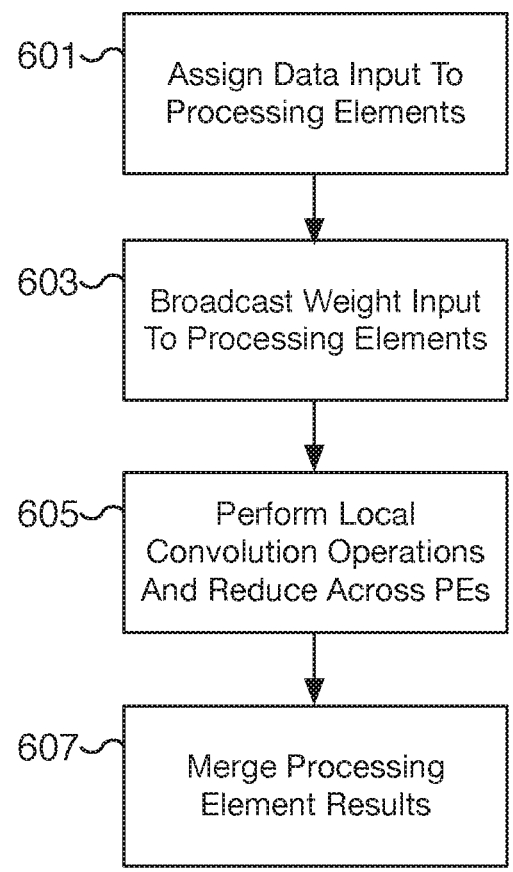
FIG. 6 is a flow chart illustrating an embodiment of a process for solving a grouped convolution problem by distributing convolution operations across processing elements.

FIG. 6 is a flow chart illustrating an embodiment of a process for solving a grouped convolution problem by distributing convolution operations across processing elements. For example, a grouped convolution problem is solved by distributing convolution operations to different processing elements and reducing the distributed results. In some embodiments, different portions of a 3D convolution data matrix and groupwise convolution weight matrices are assigned to and transmitted to different processing elements. The convolution engine of each corresponding processing element processes the received input arguments to determine convolution results. In some embodiments, each grouped convolution result data element is determined by summing together convolution results determined by multiple processing elements using a reduction network. In some embodiments, step 601 is performed at 503 and/or 505 of FIG. 5, steps 603 and 605 are performed at 505 of FIG. 5, and/or step 607 is performed at 507 of FIG. 5. In some embodiments, the process of FIG. 6 is implemented using a hardware system such as system 100 of FIG. 1.

At 601, data input elements are assigned to and transmitted to processing elements. For example, data elements of a portion of data elements in a convolution data matrix are assigned to each eligible processing element. The data elements assigned to a particular processing element may come from different channels and different groups within the convolution data matrix. For example, for a grouped convolution computed over four channels, the first channel of each group can be assigned to a first processing element, the second channel of each group can be assigned to a second processing element, the third channel of each group can be assigned to a third processing element, and the fourth channel of each group can be assigned to a fourth processing element. In the event each processing element and its respective convolution engine can process 32 input matrices, each processing element is assigned to process the appropriate channel of 32 different groups. The same process is applied as appropriate for a grouped convolution computed over a different number of channels. Additional groups can be assigned to different sets of processing elements as needed.

At 603, weight input elements are broadcasted to processing elements. For example, data elements making up weight input elements and corresponding to the data input elements assigned at 601 are broadcasted to the appropriate processing elements. In some embodiments, the weight input elements are data elements from different convolution weight groups (or filter groups). For example, for a grouped convolution computed over four channels and processing elements each configured with a convolution engine that can process 32 input matrices, 32 different weight groups are broadcasted to the processing elements. The first channel of each of the 32 different weight groups is received at the first processing element, the second channel of each of the 32 different weight groups is received at the second processing element, the third channel of each of the 32 different weight groups is received at the third processing element, and the fourth channel of each of the 32 different weight groups is received at the fourth processing element. The four processing elements correspond to the four processing elements in the example of step 601. The same process is applied as appropriate for a grouped convolution computed over a different number of channels. Additional groups can be assigned to different sets of processing elements as needed.

In some embodiments, the same weight data elements are broadcasted to multiple processing elements. For example, the first channel of each of 32 different weight groups can be received and utilized by multiple processing elements. Although the processing elements receive the same weights, the corresponding data elements of the convolution data matrix assigned to and received by each processing element at 601 are different. For example, the different processing elements are assigned to process different portions of the convolution data matrix, such as different row portions of the convolution data matrix. By broadcasting the same weight data elements to multiple processing elements, the efficiency of the data transfer for the weight input to processing elements is significantly improved.

At 605, local convolution operations are performed and the results reduced across processing elements. For example, each processing element performs convolution operations such as channel convolution operations on the received data and weight elements. Multiple local convolution results can be computed by each processing element to determine a vector of local convolution results. Each local convolution result can correspond to a partial result used together with the local results of one or more other processing elements to determine a groupwise convolution result data element. For example, the partial results computed across multiple processing elements are reduced using a reduction network to determine a groupwise convolution result data element.

In some embodiments, the partial results are summed by transmitting the local convolution results across a reduction network and performing a running sum at each node of the network. For example, for a grouped convolution computed over four channels, the first partial grouped convolution result is computed by a first processing element, the second partial grouped convolution result is computed by a second processing element, the third partial grouped convolution result is computed by a third processing element, and the fourth partial grouped convolution result is computed by a fourth processing element. Each partial result corresponds to a different one of the four channels. The first partial result is transmitted to the second processing element via the reduction network where the first and second partial results are summed together and reduced to a single result. The reduced result is transmitted by the second processing element to the third processing element via the reduction network. At the third processing element, the received reduced result and the third partial result are summed together and reduced to a single result. That reduced result is transmitted via the reduction network to the fourth processing element where it is summed together with the fourth partial result to determine a groupwise convolution result data element. In some embodiments, each processing element in the above example can compute a groupwise convolution result data element for multiple groups, each group having four channels. For example, four convolution engines that can each process 32 pairs of data and weight inputs can compute 32 different groupwise convolution result data elements. Although four channels are used in the example, the number of channels per group can be another appropriate value. By utilizing point-to-point connections between processing elements, the local convolution operations are transmitted and reduced more efficiently at least in part by avoiding unnecessary memory writes. The result is a significant performance improvement in computing groupwise convolution result data elements.

At 607, processing element results are merged. For example, the groupwise convolution result data elements computed at 605 are merged together to determine a final result for a grouped convolution operation. In some embodiments, the groupwise convolution result data elements are merged by their respective processing elements by writing to a shared location such as a shared memory location. By writing all results to a shared memory location, the groupwise convolution result data elements can be merged into a groupwise convolution result matrix.

Figure 7:
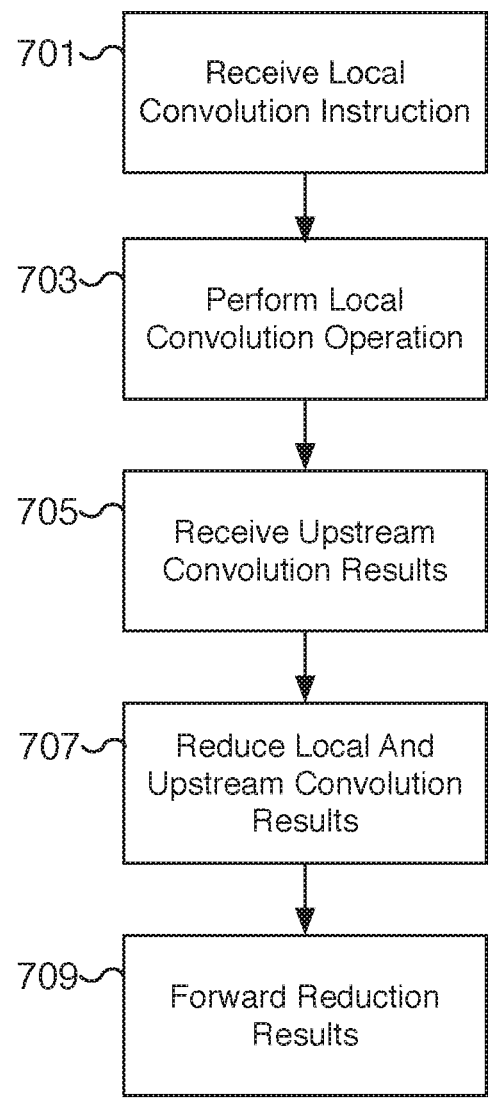
FIG. 7 is a flow chart illustrating an embodiment of a process for solving a grouped convolution problem by distributing convolution operations across processing elements.

FIG. 7 is a flow chart illustrating an embodiment of a process for solving a grouped convolution problem by distributing convolution operations across processing elements. In various embodiments, the process of FIG. 7 is performed by each of the processing elements used to perform a portion of the computation required to solve the grouped convolution problem distributed across multiple processing elements. In some embodiments, the process of FIG. 7 is performed at least in part at or in response to 503, 505, and/or 507 of FIG. 5 and/or 605 and/or 607 of FIG. 6. In some embodiments, the process of FIG. 7 is performed by one or more processing elements of system 100 of FIG. 1.

At 701, a local convolution instruction is received. For example, a channel convolution instruction is received at a processing element. In some embodiments, the instruction is processed by a control logic of the processing element such as control logic 213 of FIG. 2. In various embodiments, the convolution instruction includes a specific convolution operation and convolution arguments specifying the data elements to perform the convolution operation on. In some embodiments, the convolution instruction is used to solve a grouped convolution problem using a convolution engine of the processing element such as a channel convolution engine.

In some embodiments, the local convolution arguments corresponding to the local convolution instruction are received. For example, data elements of a convolution data matrix along with corresponding data elements of corresponding groupwise convolution weight matrices are received. The elements may correspond to multiple different groups of the grouped convolution problem and are assigned to the processing element as part of distributing the computation for solving the grouped convolution problem. In some embodiments, data elements are processed at a data input unit of a convolution engine, such as data input unit 403 of FIG. 4, and weight elements are processed at a weight input unit of a convolution engine, such as channel weight input unit 405 of FIG. 4.

At 703, a local convolution operation is performed. For example, using a convolution engine, a local convolution operation is performed by the processing element. In some embodiments, the convolution engine is a channel convolution engine such as channel convolution engine 400 of FIG. 4 and channel convolution operations are performed. In some embodiments, multiple convolution operations are performed in parallel, for example, by different vector units of the convolution engine. Each vector unit can be capable of outputting a convolution operation result. For example, a channel convolution engine with 32 vector units can output 32 channel convolution results. In some embodiments, the results are outputted as a 32-element vector of output results at an output unit such as output unit 409 of FIG. 4. The convolution output results are transmitted to a local reduction unit such as reduction unit 217 of FIG. 2.

At 705, upstream convolution results are received. For example, the processing result of an upstream processing element is received via a point-to-point connection. The processing result may be a vector of convolution results determined using a convolution engine of the upstream processing element. In some embodiments, the processing result is a result of an upstream reduction unit that merges results from multiple upstream processing elements. In various embodiments, the upstream convolution results are received at a reduction unit such as reduction unit 217 of FIG. 2.

At 707, local and upstream convolution results are reduced. For example, a local convolution result computed by a local convolution operation performed at 703 is merged with an upstream convolution result received at 705. In some embodiments, the local and upstream results are reduced by summing the two inputs together using a reduction unit such as reduction unit 217 of FIG. 2. In various embodiments, multiple convolution results corresponding to different channels and different groups within a convolution data matrix are reduced in parallel.

At 709, reduction results are forwarded. In some embodiments, the reduced results are forwarded via a point-to-point connection to a downstream processing element. The downstream processing element may merge the reduced result with the convolution engine results computed by the convolution engine of the downstream processing element. By forwarding the reduced results directly to the downstream processing element, the number of memory writes required is minimized and results in improved performance and reduced power requirements.

Figure 8:
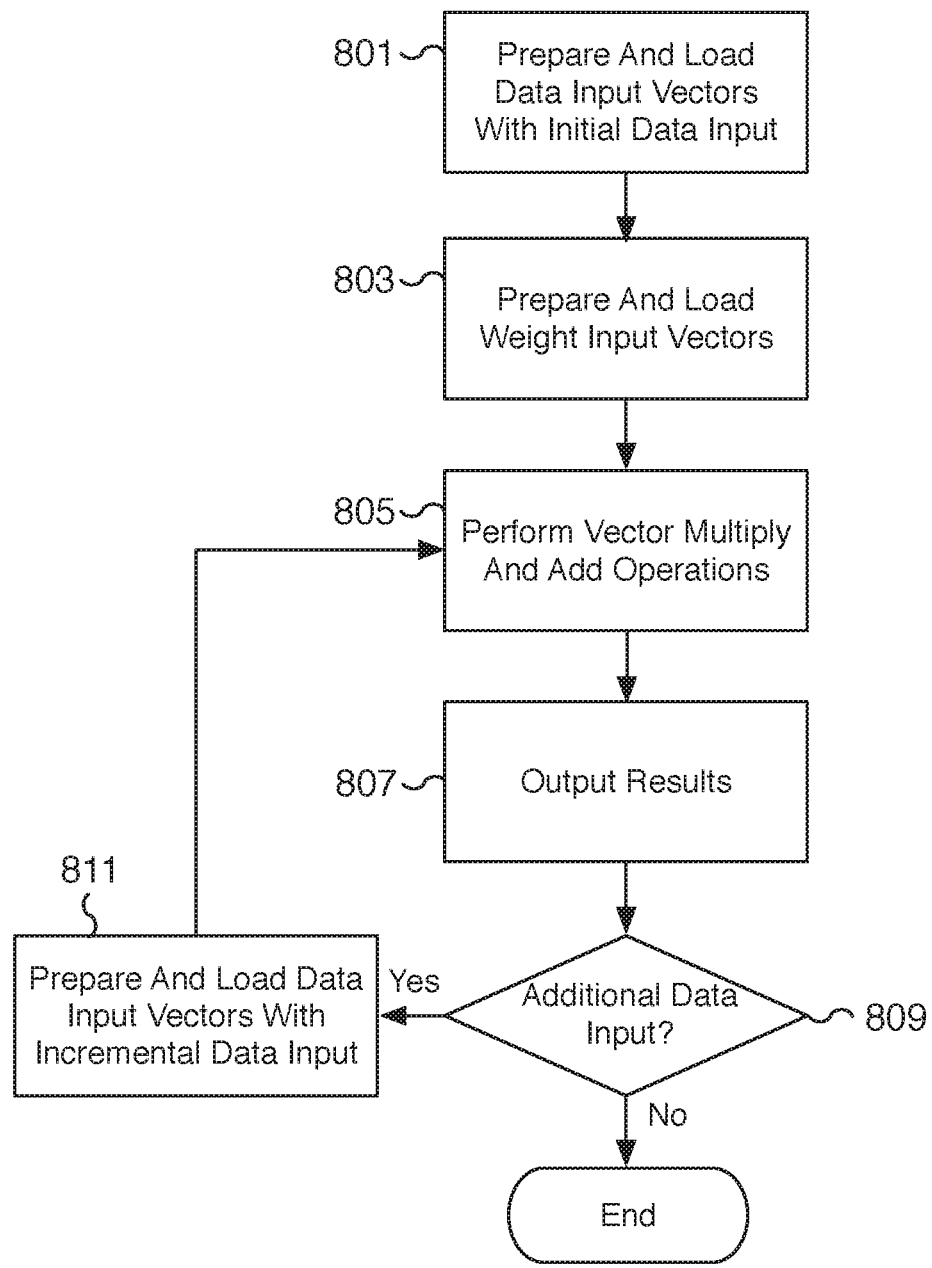
FIG. 8 is a flow chart illustrating an embodiment of a process for performing convolution operations using a channel convolution processor to solve a grouped convolution problem.

FIG. 8 is a flow chart illustrating an embodiment of a process for performing convolution operations using a channel convolution processor to solve a grouped convolution problem. For example, data input vectors are loaded into vector units of a channel convolution processor unit along with weight input vectors to determine channel convolution result data element results. Each data input vector is a two-dimensional sub-matrix slice of a portion of a three-dimensional convolution data input matrix. Each weight input vector is a two-dimensional matrix slice of a groupwise convolution weight matrix associated with a channel of the three-dimensional convolution data input matrix. Each vector unit performs a dot product result to determine a channel convolution result data element result that corresponds to a partial groupwise convolution result data element. In various embodiments, once an initial set of data input and the corresponding weight input are loaded into vector units of the channel convolution processor unit, subsequent portions of the convolution data input matrix can be processed by only loading incremental portions of the convolution data input matrix. The weight input matrices and portions of the data input used to determine the previous convolution results can be reused with improved efficiency and performance benefits.

In some embodiments, the process of FIG. 8 is performed as part of the processes of FIGS. 5, 6, and/or 7. For example, in some embodiments, the process of FIG. 8 is performed at or in response to 505 and/or 507 of FIG. 5 and/or the steps 801 and/or 811 may be performed at or in response to 601 of FIG. 6, the step 803 at or in response to 603 of FIG. 6, the steps 805, 807, and/or 809 at 605 of FIG. 6, and/or the step 807 at 607 of FIG. 6. As another example, in some embodiments, the steps 801, 803, 809, and/or 811 may be performed at 701 of FIG. 7 and/or the steps 805 and/or 807 at 703 of FIG. 7.

In some embodiments, the process of FIG. 8 is performed by processing elements such as the processing elements of FIG. 1 and using a channel convolution engine such as channel convolution engine 400 of FIG. 4. In some embodiments, the data input and weight input for the vector units of the channel convolution processor unit are prepared by a data input unit and weight input unit, respectively, and the channel convolution results are gathered at an output unit. In some embodiments, the data input unit is data input unit 403 of FIG. 4, the weight input unit is channel weight input unit 405 of FIG. 4, and the output unit is output unit 409 of FIG. 4.

At 801, data input vectors are prepared with an initial set of data input and loaded to vector units of a channel convolution processor unit. For example, data elements corresponding to matrix slices of a three-dimensional convolution data input matrix are prepared as data input vectors for the initial set of data input. In various embodiments, the initial set of data input requires loading each data element. In some embodiments, each data input vector corresponds to a two-dimensional sub-matrix or matrix slice of a portion of a three-dimensional convolution data input matrix and corresponds to a particular channel. Each data input vector can correspond to a different group within the convolution data input matrix. The number of data input vectors corresponds to the number of vector units of the channel convolution processor unit and is the number of channels that can be processed in parallel. In some embodiments, the number of data input vectors also corresponds to the number of groups that can be processed in parallel when elements are retrieved from only one channel for each group within the convolution data input matrix. For example, in the event 32 channels, one from each of 32 different groups, are processed in parallel, 32 data input vectors are prepared and one is loaded into each vector unit of the channel convolution processor unit.

In some embodiments, each matrix stored in a data input vector is a 3×3 matrix and matches the size of a corresponding weight matrix slice of a groupwise convolution weight matrix. In various embodiments, the size of the matrices may be another size, such as 5×5, 7×7, 9×9, 11×11 or another appropriate size. The size of each data input vector is based on the size of the matrix and is the number of elements of the matrix. For example, for a 3×3 matrix, each data input vector has 9 data elements and the vector unit can process 9 data elements to go along with 9 weight elements. As another example, for a 5×5 matrix, each data input vector has 25 data elements and the vector unit can process 25 data elements to go along with 25 weight elements.

In various embodiments, once prepared, each data input vector is loaded to an appropriate vector unit of the channel convolution processor unit. For example, each vector unit of the channel convolution unit is loaded with a prepared data input vector. The elements of the prepared data input vector correspond to a sub-matrix (or matrix slice) from a single channel of the convolution data input matrix. In various embodiments, the corresponding data elements of each data input vector each have the same width and height location in the convolution data input matrix but have different channel locations and are from different groups within the matrix. In addition to the data input vector, each vector unit receives a corresponding weight input vector at 803.

At 803, weight input vectors are prepared and loaded to vector units of a channel convolution processor unit. For example, weight data elements corresponding to a set of weight matrix slices associated with different matrix slices of a three-dimensional convolution data input matrix are prepared as weight input vectors. In various embodiments, the weight elements associated with the initial set of convolution data input requires loading each weight data element to the corresponding vector units. In some embodiments, processing of subsequent additional convolution data can reuse the same weight input data without additional processing to prepare new weight input vectors. In some embodiments, each weight input vector corresponds to a different two-dimensional weight matrix associated with a different channel of the convolution data input matrix. The number of weight input vectors corresponds to the number of vector units of the channel convolution processor unit and is the number of channels that can be processed in parallel. For example, in the event 32 channels are processed in parallel, 32 weight input vectors are prepared and one is loaded into each vector unit of the channel convolution processor unit. In some embodiments, each weight matrix stored in a weight input vector is a 3×3 weight matrix slice and matches the size of a corresponding convolution data sub-matrix slice. In various embodiments, the size of the weight matrices may be another size, such as 5×5 weight matrix slices or another appropriate size. The size of each weight input vector is based on the size of the weight matrix slice and is the number of elements of the matrix slice. For example, for a 3×3 weight matrix slice, each weight input vector has 9 weight data elements and the vector unit can process 9 weight data elements to go along with 9 convolution data elements. As another example, for a 5×5 weight matrix slice, each weight input vector has 25 weight data elements and the vector unit can process 25 weight data elements to go along with 25 convolution data elements.

In various embodiments, once prepared, each weight input vector is loaded to an appropriate vector unit of the channel convolution processor unit based on the corresponding data input vector. For example, each vector unit of the channel convolution unit is loaded with a prepared weight input vector. The elements of the prepared weight input vector correspond to a weight matrix slice associated with a sub-matrix from a single channel of the convolution data input matrix. In addition to the weight input vector, each vector unit receives a corresponding data input vector at 801.

At 805, vector multiply and vector add operations are performed. Utilizing the input vectors loaded from data input vectors at 801 or 811 and from weight input vectors at 803, each corresponding vector unit of a channel convolution processor unit performs vector multiply and add operations. Each element from a data input vector is multiplied by its corresponding element from a weight input vector. The result is a vector of multiplication results. For example, using 3×3 data and weight matrices, each one of nine data elements is multiplied against a corresponding one of nine weight elements to determine nine multiplication results. In some embodiments, the vector multiplication operation is performed by a vector multiply unit of a vector unit. Using the vector multiply result, a vector sum result is calculated by adding each of the elements from the vector of multiplication results. In various embodiments, the result is a channel convolution result data element and corresponds to a partial groupwise convolution result data element. In some embodiments, the sum is determined using a vector adder unit of the vector unit. For example, a vector adder unit using an adder tree can compute the sum of the vector elements. In some embodiments, each vector unit of a channel convolution processor unit performs a dot product operation using its corresponding loaded data input vector and weight input vector. The dot product result is a channel convolution result data element that corresponds to a partial groupwise convolution result data element. In various embodiments, multiple partial groupwise convolution result data elements computed by different processing elements are summed together using a reduction network to compute a final groupwise convolution result data element. In some embodiments, the vector multiply unit used to perform vector multiply operations is a vector multiply unit such as vector multiply unit 413 or 423 of FIG. 4 and the vector adder unit used to perform vector add operations is a vector adder unit such as vector adder unit 415 or 425 of FIG. 4. In some embodiments, each vector unit of a channel convolution processor unit performs its vector operations in parallel. For example, a channel convolution processor unit with 32 vector units can compute 32 convolution result data elements corresponding to 32 different channels in parallel.

At 807, results are outputted. For example, the convolution result determined by performing the vector multiply and add operations at 805 is outputted from the channel convolution processor unit. In some embodiments, a vector of convolution results (for example, 32 convolution results corresponding to 32 different channels and/or groups within a convolution data input matrix) is determined since the channel convolution processor unit includes multiple vector units configured to work in parallel. The vector of results is outputted as an output vector result, for example, to an output unit such as output unit 409 of FIG. 4. The output unit may be used to write the output vector result to a reduction unit such as reduction unit 217 of FIG. 2. In some embodiments, the output is written to a memory location in the event no reduction is needed. In various embodiments, the results are reduced at a reduction unit by summing together the results determined at 805 with the results computed at an upstream processing element.

At 809, a determination is made whether additional data input remains to be processed. For example, when traversing the assigned portions of a convolution data input matrix horizontally along the width dimension, a determination is made whether additional columns of the assigned portions of a convolution data input matrix exist. Similarly, when traversing vertically along the height dimension of the assigned portions of a convolution data input matrix, a determination is made whether additional rows exist. In the event additional data input of the assigned portions of a convolution data input matrix remains to be processed, processing proceeds to 811. In the event no additional data input remains to be processed, processing ends.

At 811, data input vectors using incremental data input are prepared and loaded to vector units of a channel convolution processor unit. For example, incremental data corresponding to the next column (or row) of data of the assigned portions of a convolution data input matrix is loaded. When traversing horizontally along the width dimension, an additional column of the assigned portions of a convolution data input matrix is loaded. Similarly, when traversing vertically along the height dimension, an additional row of the assigned portions of a convolution data input matrix is loaded. This incremental data is used along with data loaded from the previous iteration of 801 or 811 (to the extent data elements overlap from the previous iteration and can be reused) to prepare input data vectors. For example, when traversing horizontally, data from the second and third columns of the previous iteration are shifted to the first and second columns and combined with the newly loaded third column to create new data input vectors. The new data input vectors correspond to shifting the sub-matrix slice of a convolution data input matrix horizontally. In some embodiments, the new data input vectors correspond to sliding the relevant convolution matrix of the convolution data along the width dimension. Similarly, when traversing vertically, data from the second and third rows of the previous iteration are shifted to the first and second rows and combined with the newly loaded third row to create new data input vectors. The new data input vectors correspond to shifting the sub-matrix slice of a convolution data input matrix vertically. In some embodiments, the new data input vectors correspond to sliding the relevant convolution matrix of the convolution data along the height dimension. In various embodiments, only the initial set of data input requires loading an entire matrix slice of data elements and is performed at 801. At 811, only incremental data elements are needed.

In various embodiments, the new data input vectors corresponding to new sub-matrices or matrix slices of the assigned portions of the convolution data input matrix are loaded to the corresponding vector units. The existing weight input vectors can be reused since the relative channel dimensions have not changed. By only loading the new incremental convolution data and reusing the weight data elements, significant performance improvements are achieved when performing convolution operations.

Figure 9:
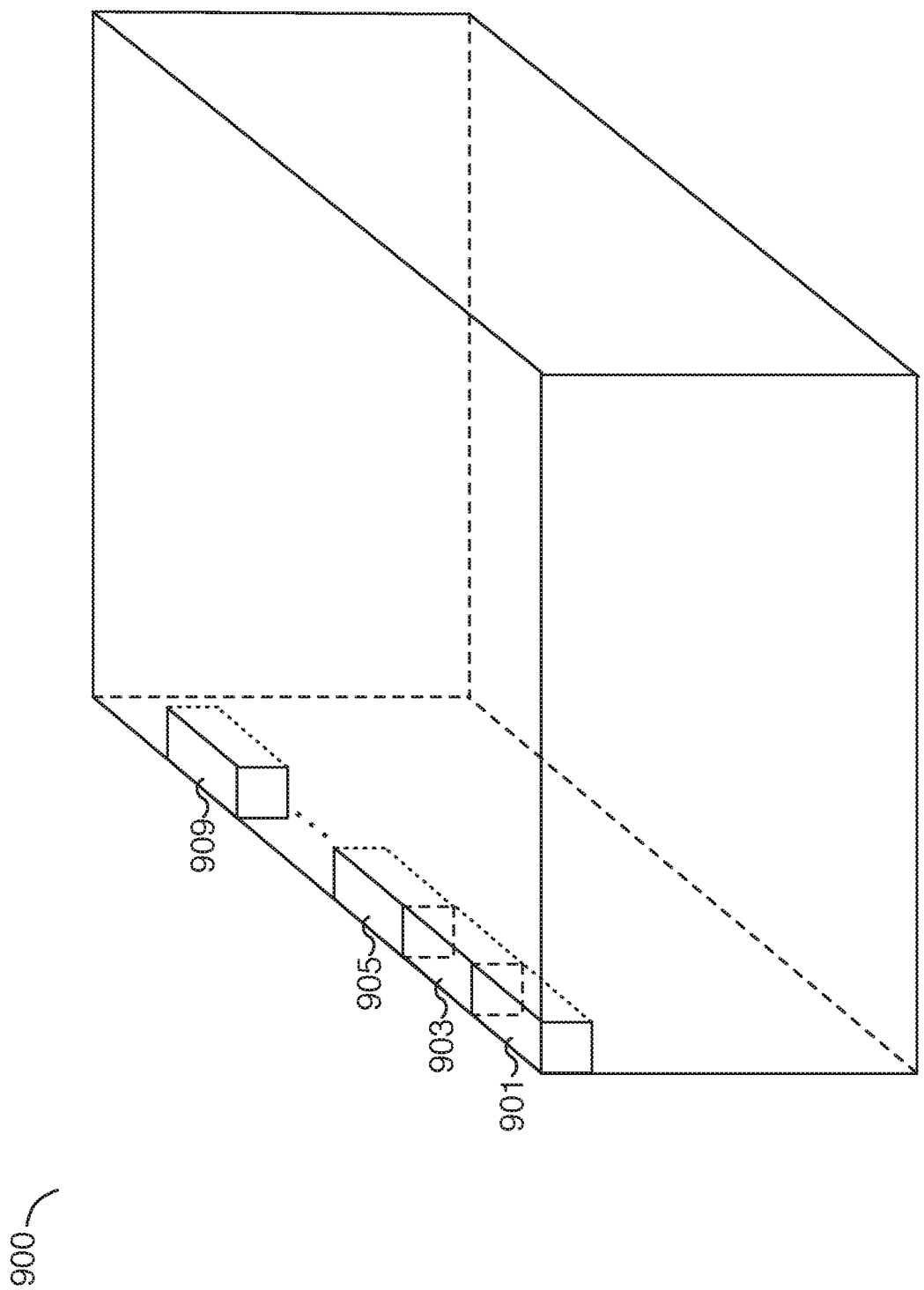
FIG. 9 is a diagram illustrating an example convolution data input matrix for solving a grouped convolution problem.

FIG. 9 is a diagram illustrating an example convolution data input matrix for solving a grouped convolution problem. In the example shown, three-dimensional convolution data input matrix 900 includes three-dimensional sub-matrix groups 901, 903, 905, and 909. In some embodiments, a grouped convolution problem is performed using convolution data input matrix 900 by distributing the computation across multiple processing elements. Convolution data input matrix 900 is divided into groups that are grouped convolution arguments. As an example, four example groups 901, 903, 905, and 909 are depicted. In various embodiments, the corresponding groupwise convolution weight matrices are illustrated in FIG. 10. In some embodiments, convolution data input matrix 900 is an activation data matrix or a convolution data input matrix processed using the processes of FIGS. 5-8 and by a hardware system such as system 100 of FIG. 1.

In some embodiments, a portion of data elements of convolution data input matrix 900 is assigned to each processing element for performing convolution operations. For example, the first channel of each group among a plurality of different groups within convolution data input matrix 900 can be assigned to a first processing element. In some embodiments, the first channel could include the first channel of at least groups 901, 903, 905, and 909. Each first channel of groups 901, 903, 905, and 909 is a sub-matrix or matrix slice of a group. Continuing the example, the second channel of each group among the plurality of different groups within convolution data input matrix 900 can be assigned to a second processing element. Similarly, the third channels can be assigned to a third processing element and the fourth channels assigned to a fourth processing element. In the event each group is four channels deep, only four processing elements are needed to processes an entire group. In various embodiments, the number of groups that can be processed in parallel is based on the configuration of the convolution engines of the processing elements. For a processing element with a convolution engine configured with 32 vector units, 32 different groups can be processed in parallel by each processing element. Thus, for groups that are four channels deep, four processing elements, each configured with 32 vector units, can process 32 groups in parallel. In the example of FIG. 9, four of the 32 groups are shown. The remaining 28 groups reside at the same height and width locations of the data elements of groups 901, 903, 905, and 909 but at different channel depths. Although four channels are used in the example, the groups can have fewer or more channels, as appropriate. Similarly, the convolution engines can be configured with a different number of vector units to process a different number of groups in parallel. In various embodiments, even when the grouped convolutions are computed over a small number of channels, the disclosed techniques and hardware platform continue to utilize the hardware resources efficiently.

In the example shown, groups 901, 903, 905, and 909 are depicted with a particular height and width and at particular XYZ locations. Using the disclosed techniques, similar groups are assigned to different processing elements. For example, different rows of groups can be assigned to a different group of processing elements. As another example, different columns of groups can be assigned to a different group of processing elements. Similarly, in the event the depth of convolution data input matrix 900 exceeds the capacity of a single group of processing elements, additional groups of processing elements can be assigned to additional groups along the depth of convolution data input matrix 900.

In some embodiments, the groups within convolution data input matrix 900, such as groups 901, 903, 905, and 909, each have width, height, and depth (channel) dimensions that are the same as the associated three-dimensional groupwise convolution weight matrices. For example, groups 901, 903, 905, and 909 may each have the dimensions 3×3×4 with each matrix slice having dimensions 3×3. Each matrix slice of a group represents the data elements a channel convolution processor unit can process during one iteration (or cycle). In some embodiments, a subsequent iteration (or cycle) processes an additional column (or row) of data elements by sliding the matrix slices used as convolution arguments horizontally (or vertically) along the width (or height) dimension of convolution data input matrix 900 but keeping the same channels.

In some embodiments, groups 901, 903, 905, and 909 represent an initial set of data input to the channel convolution engines of a group of processing elements. A subsequent set of data input for the same group of processing elements may include the groups (not shown) that are shifted along the width (or height) dimension. In some embodiments, for each respectively assigned processing element, groups 901, 903, 905, and 909 are prepared at 801 of FIG. 8 and subsequent shifted groups are prepared at 811 of FIG. 8. In various embodiments, the channel convolution engines are each channel convolution engine 400 of FIG. 4.

In various embodiments, each matrix slice of a group is prepared as arguments for a channel convolution processor unit of a channel convolution engine by a data input unit such as data input unit 403 of FIG. 4. The matrix slice may be converted by the data input unit into a corresponding data input vector by linearizing the two-dimensional matrix slice into a one-dimensional vector for a vector unit of the channel convolution processor unit. In various embodiments, convolution data input matrix 900 is stored using a channel-first layout and associated groups, such as groups 901, 903, 905, and 909, are retrieved using channel-first layout memory reads. For example, the data element at width, height, and channel location (1,1,1) of convolution data input matrix 900 is stored adjacent to the data element at width, height, and channel location (1,1,2) and the two data elements can be read together with a single memory read and/or cache line memory read. For a 32-data element cache line, data elements (1,1,1) through (1,1,32) can be read in a single memory read. A subsequent read can load the data elements at width, height, and channel location (1,2,1) through (1,2,32).

FIG. 10 is a diagram illustrating an example set of groupwise convolution weight matrices for solving a grouped convolution problem. In the example shown, groupwise convolution weight matrices 1001, 1003, 1005, and 1009 are part of a larger set of groupwise convolution weight matrices for solving a grouped convolution problem using groups within an activation or convolution data input matrix such as convolution data input matrix 900 of FIG. 9. The total number of groupwise convolution weight matrices may match the number of groups along the channel dimension of the applicable convolution data input matrix. A subset of the groupwise convolution weight matrices is matched with a number of selected groups within the convolution data argument, such as groups 901, 903, 905, and 909 of FIG. 9, and assigned to a set of processing elements for performing convolution operations. The convolution operations are performed by the set of processing elements and their respective convolution engines. In some embodiments, each convolution engine is a channel convolution engine such as channel convolution engine 400 of FIG. 4 and the processing elements are the processing elements of system 100 of FIG. 1. In the example shown, the width, height, and depth (channel) dimensions of each groupwise convolution weight matrix, such as groupwise convolution weight matrices 1001, 1003, 1005, and 1009, match the width, height, and depth (channel) dimensions of each corresponding group within the convolution data input matrix, such as groups 901, 903, 905, and 909 of FIG. 9. For example, in some embodiments, each groupwise convolution weight matrices 1001, 1003, 1005, and 1009 has dimensions 3×3×4 and each corresponding group of the convolution data input matrix, such as groups 901, 903, 905, and 909 of FIG. 9, also has dimensions 3×3×4.

In various embodiments, weight matrix slices of a set of groupwise convolution weight matrices, such as groupwise convolution weight matrices 1001, 1003, 1005, and 1009, are prepared as arguments for a channel convolution processor unit. For example, a single channel of a groupwise convolution weight matrix is a weight matrix slice. Each weight matrix slice is a weight input argument to a vector unit of a channel convolution processor unit of a channel convolution engine. A channel convolution processor unit with multiple vector units is capable of processing multiple weight matrix slices. In some embodiments, each weight matrix slice corresponds to a single channel from a different groupwise convolution weight matrix. For example, a channel convolution processor unit with 32 vector units can process 32 different weight matrix slices from 32 different groupwise convolution weight matrices. One channel is selected from each of the 32 different groupwise convolution weight matrices. Each groupwise convolution weight matrix corresponds to a different group within the convolution data input matrix and each weight matrix slice of a groupwise convolution weight matrix corresponds to a matrix slice of a group within the convolution data input matrix. For groupwise convolution weight matrices that are four channels deep, four different processing elements can be configured to process each of the four different channels. In the event the channel convolution processor unit of each processing element is configured with 32 vector units, the four processing elements can process 32 different groupwise convolution weight matrices and corresponding groups within the convolution data input matrix. Although a channel depth of four and channel convolution processor units configured with 32 vector units each are used in the example, different channel depths and different channel convolution processor unit configurations are applicable as well.

In some embodiments, each weight matrix slice is processed by a weight input unit of a convolution engine such as channel weight input unit 405 of FIG. 4. A weight matrix slice can be converted by the weight input unit into a corresponding weight input vector by linearizing the two-dimensional weight matrix slice into a one-dimensional vector for a vector unit of the channel convolution processor unit. In some embodiments, groupwise convolution weight matrices 1001, 1003, 1005, and 1009 are stored and retrieved using a depth-first layout. In some embodiments, the groupwise convolution weight matrices are stored back-to-back along the depth dimension similar to the layout of the corresponding groups within the convolution data input matrix. For example, the data elements at width and height location (1,1) of groupwise convolution weight matrices 1001, 1003, 1005, and 1009 are stored adjacent to one another. In some embodiments, the data elements at (1,1) can be read together with a single memory read and/or cache line memory read. A subsequent read can load the data elements at width and height location (1,2) of groupwise convolution weight matrices 1001, 1003, 1005, and 1009.

Figure 11:
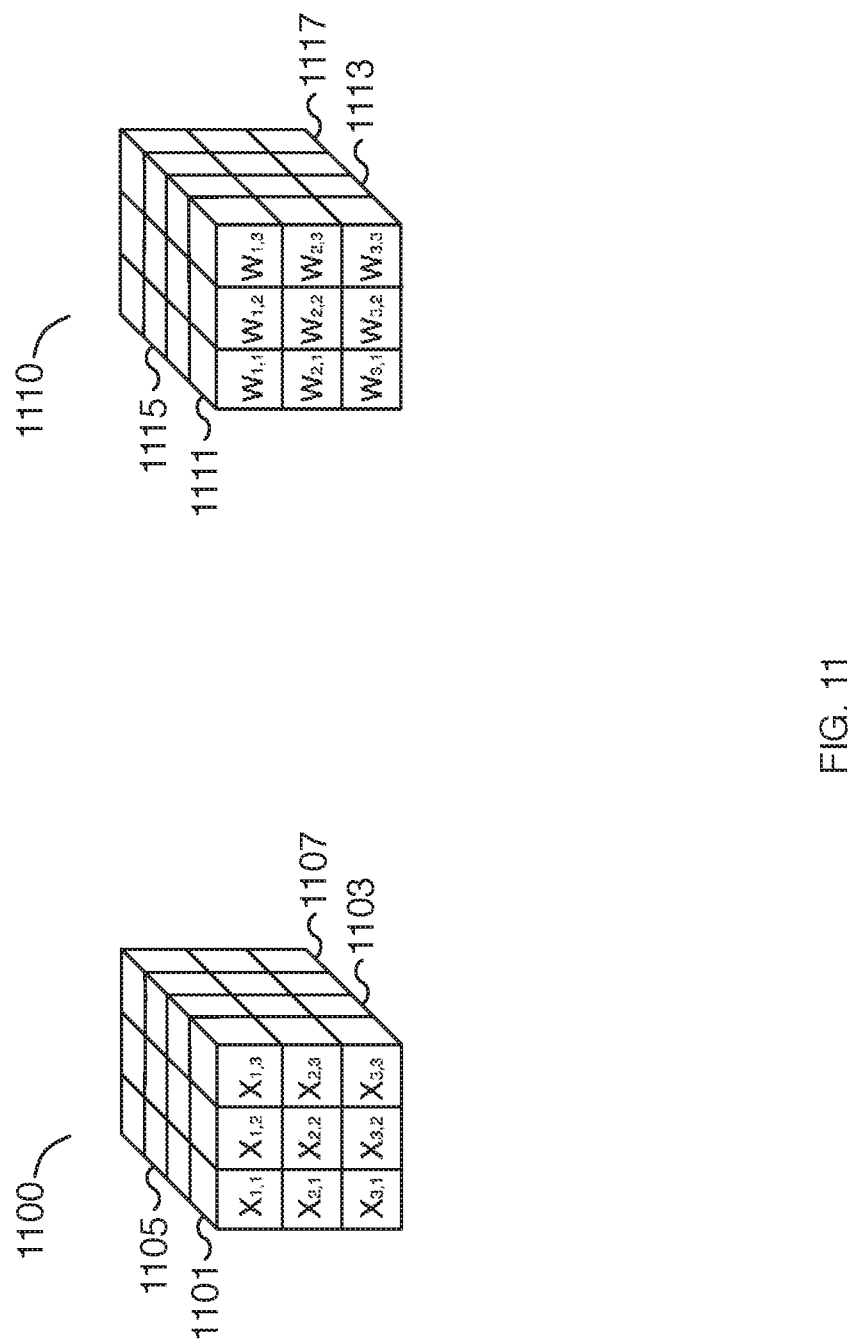
FIG. 11 is a diagram illustrating an example data elements group matrix and a corresponding groupwise convolution weight matrix for solving a grouped convolution operation.

FIG. 11 is a diagram illustrating an example data elements group matrix and a corresponding groupwise convolution weight matrix for solving a grouped convolution operation. In the example shown, data elements group matrix 1100 is a 3×3×4 matrix group from within a convolution data input matrix. In some embodiments, data elements group matrix 1100 is a group within convolution data input matrix 900 of FIG. 9 and can be one of groups 901, 903, 905, or 909 of FIG. 9. In the example shown, weight matrix 1110 is a 3×3×4 groupwise convolution weight matrix with weight data elements corresponding to data elements group matrix 1100. In some embodiments, weight matrix 1110 is one of groupwise convolution weight matrices 1001, 1003, 1005, and 1009 of FIG. 10. The two matrices, data elements group matrix 1100 and weight matrix 1110, are a pair of groupwise matrix arguments for performing a groupwise convolution. Using the techniques and hardware disclosed herein, the computation of the grouped convolution operation is distributed across multiple processing elements and the results reduced to determine a groupwise convolution result. In various embodiments, the grouped convolution operation is performed using the processes of FIGS. 5-8 and the hardware of FIGS. 1-4.

In the example shown, data elements group matrix 1100 and weight matrix 1110 each include four 3×3 matrix slices, each at a different depth (or channel). Data elements group matrix 1100 includes data group matrix slices 1101, 1103, 1105, and 1107 at depths 1, 2, 3, and 4, respectively. Weight matrix 1110 includes weight matrix slices 1111, 1113, 1115, and 1117 at depths 1, 2, 3, and 4, respectively. Data group matrix slice 1101 is depicted with data elements $X_{1,1}$, $X_{1,2}$, $X_{1,3}$, $X_{2,1}$, $X_{2,2}$, $X_{2,3}$, $X_{3,1}$, $X_{3,2}$, and $X_{3,3}$, where the subscripts represent width and height positions. Similarly, the weight matrix slice 1111 is depicted with weight elements $W_{1,1}$, $W_{1,2}$, $W_{1,3}$, $W_{2,1}$, $W_{2,2}$, $W_{2,3}$, $W_{3,1}$, $W_{3,2}$, and $W_{3,3}$, where the subscripts represent width and height positions. The data elements of data group matrix slice 1101 and weight elements of weight matrix slice 1111 that share similar subscripts correspond to one another for performing a convolution operation. Although data and weight elements are not shown for the remaining matrix slices, the same associations apply for each matrix slice pair of data elements group matrix 1100 and weight matrix 1110. Each data group matrix slice has a corresponding weight matrix slice used for computing the grouped convolution. For example, data group matrix slice 1101 is paired with weight matrix slice 1111. Similarly, data group matrix slices 1103, 1105, and 1107 are each paired with weight matrix slices 1113, 1115, and 1117, respectively.

In some embodiments, each matrix slice pair is transmitted to the convolution engine of a different processing element. At the convolution engine, the matrix slice pair is processed and fed to a vector unit where a convolution operation is performed to determine a convolution result. For example, the convolution result of input pairs data group matrix slice 1101 and weight matrix slice 1111 is solved at a first processing element. The convolution result of input pairs data group matrix slice 1103 and weight matrix slice 1113 is solved at a second processing element. The convolution result of input pairs data group matrix slice 1105 and weight matrix slice 1115 is solved at a third processing element. And the convolution result of input pairs data group matrix slice 1107 and weight matrix slice 1117 is solved at a fourth processing element. The four convolution results are summed together to determine a groupwise convolution result data element. In some embodiments, the summing is performed using a reduction network with peer-to-peer connections between the processing elements. In the above example, only a single vector unit of a convolution processing unit from each of the four processing elements is utilized. Each additional vector unit of a channel convolution processing unit can be utilized to process an additional matrix slice pair from a different pair of data elements group and corresponding groupwise convolution weight matrices. For example, a channel convolution processor unit configured with 32 vector units can process a single channel (or matrix slice pair) from 32 different data elements group matrices and corresponding groupwise convolution weight matrices. For a grouped convolution problem computed over four channels, four processing elements can determine 32 corresponding groupwise convolution result data elements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A processor system, comprising:
   a plurality of processing elements, wherein each processing element of the plurality of processing elements includes a corresponding convolution processor unit that is configured to perform a portion of a groupwise convolution and the corresponding convolution processor unit is configured to:
   obtain a portion of data elements in a convolution data matrix for processing by the same corresponding convolution processor unit, wherein the portion of data elements for the same corresponding convolution processor unit includes different elements from a plurality of different convolution groups included in the convolution data matrix and wherein the different elements from the plurality of different convolution groups are obtained for processing together by the same corresponding convolution processor unit in a same processing iteration for a combined iteration output for the plurality of different convolution groups;

determine multiplication results of the combined iteration output by multiplying each data element of the portion of data elements in the convolution data matrix with a corresponding data element in a corresponding groupwise convolution weight matrix among a plurality of convolution weight matrices, wherein the portion of data elements in the convolution data matrix that are multiplied by the same corresponding convolution processor unit in the same processing iteration of the corresponding convolution processor unit for the combined iteration output for the plurality of different convolution groups belong to a plurality of different channels of the convolution data matrix and the plurality of different convolution groups within the convolution data matrix; and for each specific channel of the plurality of different channels, sum together at least some of the multiplication results belonging to the same specific channel to determine a corresponding channel convolution result data element;

wherein the plurality of processing elements is configured to sum together different portions of the channel convolution result data elements from a group of different convolution processor units included in the plurality of processing elements to determine a corresponding groupwise convolution result data element for each convolution group of the plurality of different convolution groups.

2. The system of claim 1, further comprising:
a point-to-point connection between a first processing element of the plurality of processing elements and a second processing element of the plurality of processing elements, wherein the point-to-point connection is configured to provide at least a result of the corresponding convolution processor unit of the first processing element to a reduction unit component of the second processing element, wherein the second processing element is configured to reduce at least the provided result of the corresponding convolution processor unit of the first processing element with a result of the corresponding convolution processor unit of the second processing element and output a reduced result; and
a communication bus connecting together at least the first processing element and the second processing element.

3. The system of claim 2, wherein the reduction unit component includes an adder.

4. The system of claim 3, wherein the adder is a vector adder.

5. The system of claim 1, wherein each of the plurality of processing elements includes a corresponding reduction unit that is a part of a network of reduction units of the plurality of processing elements, and each reduction unit of the network of reduction units includes a corresponding multiplexer configured to realign a corresponding output of the corresponding convolution processor unit and a corresponding adder configured to receive a corresponding output from the corresponding multiplexer.

6. The system of claim 2, wherein the first and second processing elements are configured to receive a convolution operation instruction via the communication bus.

7. The system of claim 2, wherein the reduction unit component is configured to add together the result of the corresponding convolution processor unit of the first processing element and the result of the corresponding convolution processor unit of the second processing element.

8. The system of claim 2, further comprising a second point-to-point connection configured to send the reduced result to a third processing element of the plurality of processing elements, and wherein the second point-to-point connection connects the second processing element to the third processing element.

9. The system of claim 8, wherein the third processing element includes a second reduction unit component and the second reduction unit component is connected to the second point-to-point connection.

10. The system of claim 2, wherein the result of the corresponding convolution processor unit of the first processing element is a first vector of channel convolution result data elements and the result of the corresponding convolution processor unit of the second processing element is a second vector of channel convolution result data elements.

11. The system of claim 1, wherein the corresponding convolution processor unit of at least one of the plurality of processing elements includes a plurality of calculation units.

12. The system of claim 11, wherein each calculation unit of the plurality of calculation units includes a different vector multiply unit and a different vector adder unit.

13. The system of claim 12, wherein each of the different vector adder units includes a different adder tree.

14. The system of claim 11, wherein each calculation unit of the plurality of calculation units is configured to receive a plurality of data elements corresponding to a same channel of a different convolution group of the convolution data matrix and a plurality of corresponding weight elements corresponding to a same channel of a groupwise convolution weight matrix among the plurality of convolution weight matrices.

15. The system of claim 14, wherein at least one of the plurality of processing elements further includes a data input unit configured to: process the plurality of data elements corresponding to the same channel of the different convolution group of the convolution data matrix into a data input vector, wherein the data input vector includes data elements corresponding to a two-dimensional sub-matrix of the convolution data matrix.

16. The system of claim 14, wherein at least one of the plurality of processing elements further includes a channel weight input unit configured to: process the plurality of corresponding weight elements corresponding to the same channel of the groupwise convolution weight matrix among the plurality of convolution weight matrices into a weight input vector, wherein the weight input vector includes data elements corresponding to a two-dimensional sub-matrix of the groupwise convolution weight matrix.

17. The system of claim 1, wherein the convolution data matrix is a three-dimensional machine learning data matrix.

18. A method, comprising:
determining a first processing result using a first convolution processor unit of a first processing element, wherein the first processing result includes channel convolution result data elements corresponding to a plurality of different channels and a plurality of different convolution groups within a convolution data matrix, and determining the first processing result includes obtaining a portion of data elements in the convolution data matrix belonging to the plurality of different channels and the plurality of different convolution groups, and wherein the portion of data elements belonging to the plurality of different convolution groups are obtained for processing together by the same first convolution processor unit in a same processing iteration for the plurality of different channels and the plurality of different convolution groups;

providing the first processing result to a reduction unit component of a second processing element via a first point-to-point connection;

determining a second processing result using a second convolution processor unit of the second processing element;

providing the second processing result to the reduction unit component of the second processing element;

summing together the channel convolution result data elements of the first processing result with corresponding channel convolution result data elements of the second processing result to create a reduced result including a plurality of different groupwise convolution result data elements for the plurality of different convolution groups; and sending the reduced result to a third processing element via a second point-to-point connection.

19. The method of claim 18, wherein the reduction unit component includes an adder and a multiplexer.

20. A microprocessor system, comprising:

a first processing element including a first convolution processor unit and a first reduction unit component;

a second processing element including a second convolution processor unit and a second reduction unit component;

a third processing element including a third convolution processor unit and a third reduction unit component;

a first point-to-point connection between the first reduction unit component of the first processing element and the second reduction unit component of the second processing element, wherein the first point-to-point connection is configured to provide at least a first output result of the first reduction unit component to the second reduction unit component, and wherein the second reduction unit component is configured to output a second output result including a plurality of different groupwise convolution result data elements for a plurality of different convolution groups by summing together at least the first output result with channel convolution results of the second convolution processor unit, wherein the channel convolution results of the second convolution processor unit correspond to a plurality of different channels and the plurality of different convolution groups within a convolution data matrix, and the second convolution processor unit is configured to obtain for determining the channel convolution results of the second convolution processor unit a portion of data elements in the convolution data matrix belonging to the plurality of different channels and the plurality of different convolution groups, and wherein the obtained portion of data elements belonging to the plurality of different convolution groups are for processing together by the same second convolution processor unit in a same processing iteration for the plurality of different channels and the plurality of different convolution groups;

a second point-to-point connection between the second reduction unit component of the second processing element and the third reduction unit component of the third processing element, wherein the second point-to-point connection is configured to provide at least the second output result of the second reduction unit component to the third reduction unit component; and a communication bus connecting together at least the first processing element, the second processing element, and the third processing element.

\* \* \* \* \*